March 10, 1970 M. F. PAUL 3,499,662
AIR CUSHION SYSTEM FOR VEHICLES
Filed July 10, 1967 2 Sheets-Sheet 1
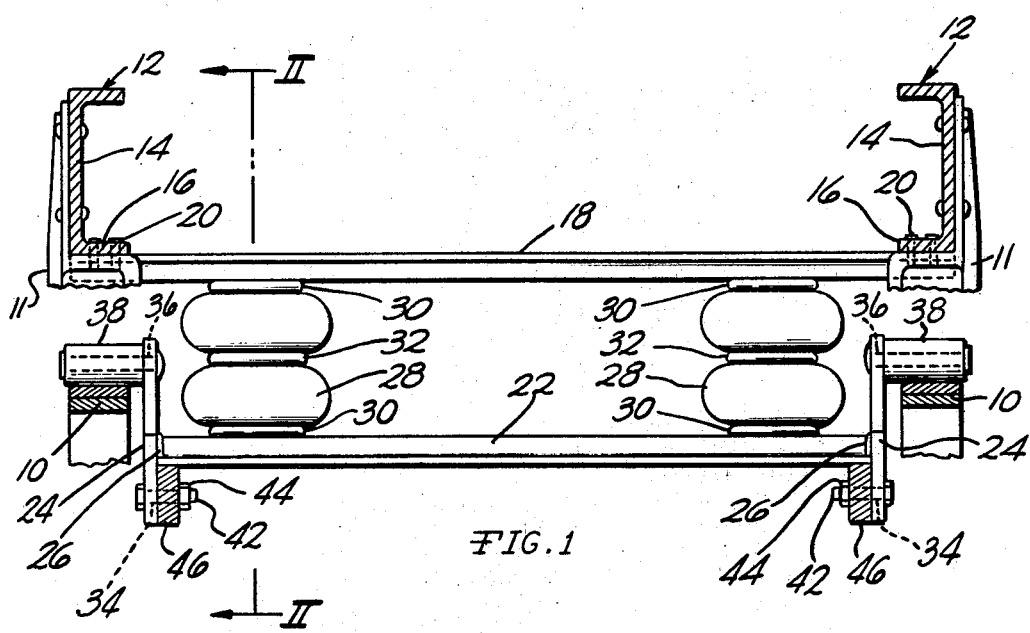
FIG. 1
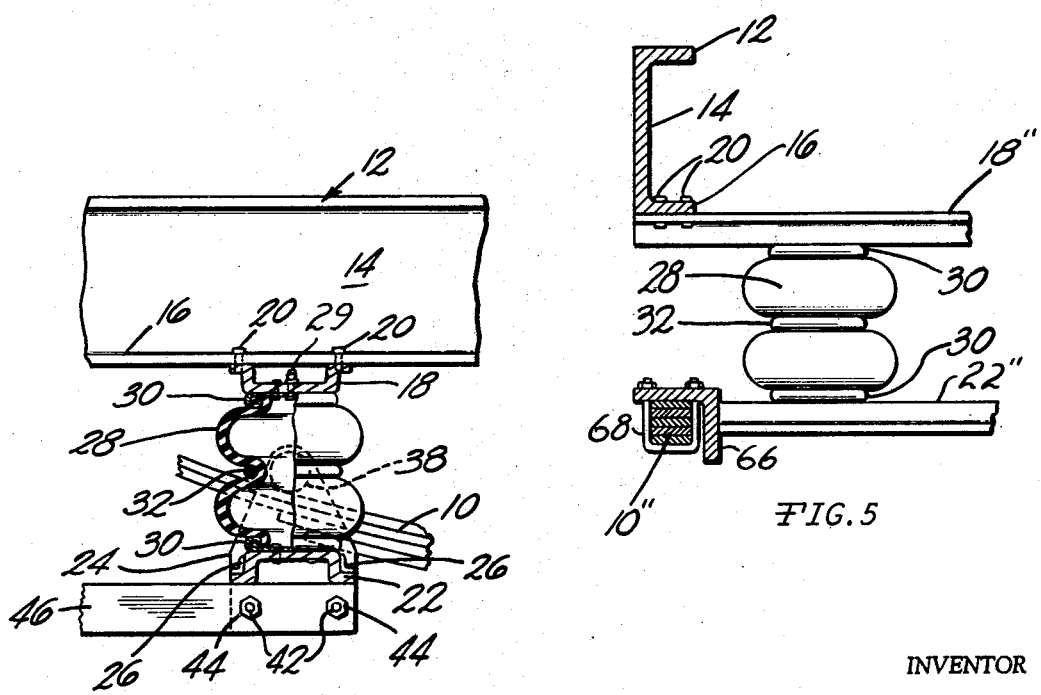
FIG. 2
FIG. 5
INVENTOR
MAHRLE F. PAUL
BY Beaman & Beaman
ATTORNEYS March 10, 1970 M. F. PAUL 3,499,662
AIR CUSHION SYSTEM FOR VEHICLES
Filed July 10, 1967 2 Sheets-Sheet 2
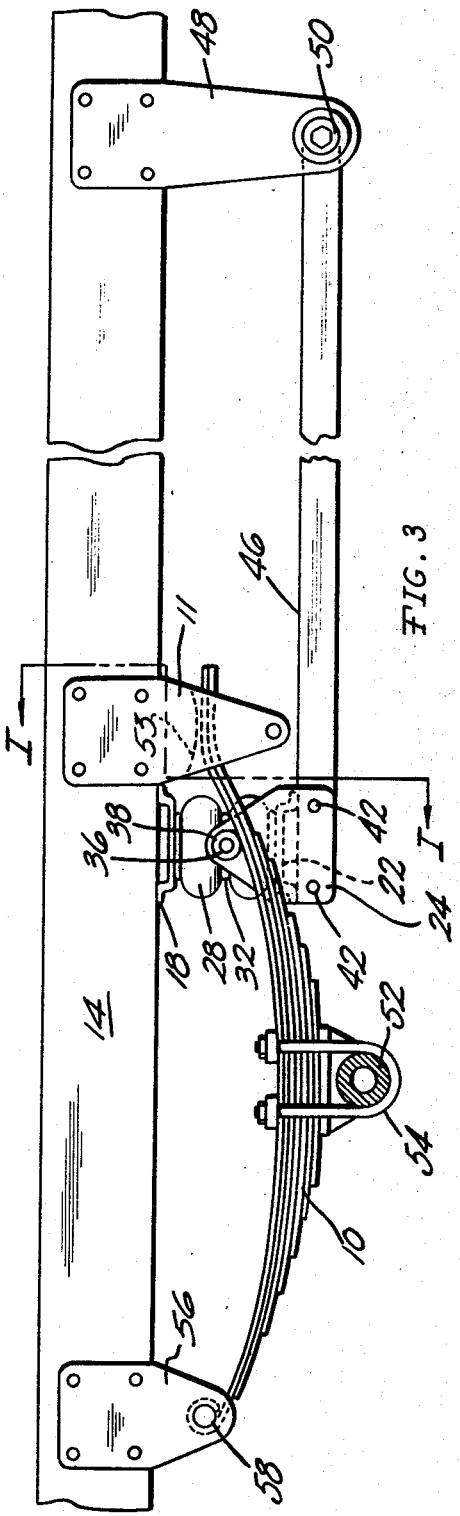
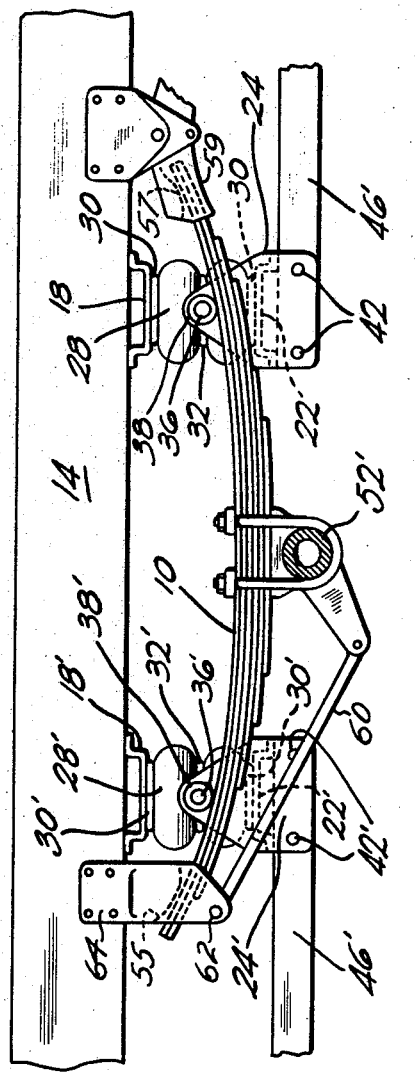
INVENTOR
MAHRLE F. PAUL
BY Beaman Beaman
ATTORNEYS

# United States Patent Office 3,499,662
Patented Mar. 10, 1970

3,499,662
AIR CUSHION SYSTEM FOR VEHICLES
Mahrle F. Paul, 4329 Page Ave.,
Michigan Center, Mich. 49254
Continuation-in-part of application Ser. No. 272,322,
Apr. 11, 1963. This application July 10, 1967, Ser.
No. 652,221
Int. Cl. B60g 11/00, 9/00
U.S. Cl. 280—124                                    8 Claims

ABSTRACT OF THE DISCLOSURE

An air cushion system for vehicles, particularly suitable for improving the suspension characteristics of truck vehicles using leaf springs, wherein unloaded and loaded vehicles may be provided with improved riding characteristics. The system of the invention may be installed upon existing vehicles, or may be installed as original equipment.

CROSS REFERENCES TO RELATED APPLICATIONS

This application is a continuation-in-part of my previous application Ser. No. 272,322, filed Apr. 11, 1963, now abandoned.

BACKGROUND OF THE INVENTION

The invention lies in the field of vehicle suspensions utilizing air cushions or envelopes to either totally or partially bear the weight of a vehicle upon its axles.

A number of prior art vehicle suspension systems have been utilized wherein air cushions are used in conjunction with leaf springs. Reference is made to U.S. Patent 3,063,732, and applicant's Patent 3,140,083. One of the problems which exists when incorporating air cushion means in a vehicle suspension system arises from clearance problems below the vehicle frame. Often, sufficient vertical space is not present between the vehicle leaf springs and the frame to include air cushion means that are directly mounted upon the springs, as shown in Patent 3,063,732. In order to accommodate devices such as shown in this patent unusual and expensive suspension systems must be designed, and often road clearance, and other limitations require compromises in the ultimate air cushioning characteristics desired. One of the features of the invention lies in its ability to be installed upon existing vehicles, and prior art devices, which may be used with the rear axles of trucks, are not readily installable on existing equipment.

SUMMARY OF THE INVENTION

In practice, load transporting vehicles, such as trucks, are normally spring suspended to accommodate the maximum load for which the vehicle is designed. As a result, when the vehicle is unloaded there is insufficient weight to properly flex the springs and damaging vibration occurs, as the vehicle travels over irregular surfaces, which are transmitted throughout the vehicle. Due to the bounce of the axles under such conditions, tires wear rapidly and the stability of the vehicle is affected. In addition, the driver of the vehicle suffers physical and mental fatigue due to the roughness of the ride. Unloaded conventionally suspended trucks, tractors, and trailers are very damaging to roads, streets, and highways, causing ruts and "washboarding" effects.

According to the present invention, it has been found that the foregoing, and other disadvantages, will be substantially overcome by the use of an air system to disengage the frame and body portion of the vehicles from the normal spring bearing surfaces to, in effect, air cushion the frame and body portion of the vehicle during the periods when the vehicle is unloaded. During such periods, the air system may be operated by captive air or by an automatically or manually controlled air supply.

The air cushion system of the invention may conveniently take the form of an air container located to one side of the vertical plane of the conventional vehicle leaf springs between adapter members attached to the spring and frame portions between which the air container is located.

The air containers of the present invention will be located as to cooperate with the leaf springs of the normal suspension system with the air supply to each container individually or collectively arranged. The design of the air container and its air supply is such that when the vehicle is loaded to the desired capacity, the air container becomes compressed to such an extent that the leaf spring suspension of the vehicle returns to its normal bearing surface.

Thus, an object of the invention is to provide an air cushion system for vehicles of the type described in which an air container is inserted between the vehicle frame and spring suspension structure to separate the normal bearing surface of the spring suspension from the frame when the vehicle is unloaded, or to otherwise modify the association between the frame and spring suspension as to substitute the cushioning of the air container for the stiffness of the normal springing of the frame, required to meet maximum loaded conditions.

The structure required to practice the inventive concept is of a relatively simple nature, and the air cushion system of the invention can be installed on original equipment or marketed in the form of a kit for installation as an accessory to most existing trucks, trailers and tractors. Installation of the air cushion system of the invention modifies the association of the vehicle frame and conventional leaf spring suspension under unloaded conditions, and the improved riding characteristics obtained are beneficial both to the vehicle driver, and the vehicle itself, as the vibration transmitted to the unloaded vehicle through the air cushioning means is much less than that transmitted through a conventional spring leaf system wherein the spring leafs are in direct engagement with the vehicle frame spring anchor brackets at all times.

The instant disclosure is an improvement over my previously submitted application in that means are provided for producing a lost motion or relatively moveable connection between the air cushioning apparatus, and the leaf spring associated therewith. In the previous application the lower portion of the air cushion devices were firmly affixed to the leaf spring. It has been found that this type of rigid interconnection has an adverse effect upon the air cushion bag or envelope due to the flexing of the leaf spring in its longitudinal direction. Due to the longitudinal flexing of the leaf spring a lateral movement is imposed upon the air cushion devices which causes the air cushion to wear excessively. In the instant application antifriction means in the form of a roller is associated with the air cushion devices and bears upon the upper side of the associated leaf spring set. Retaining means are employed to prevent lateral movement of the air cushioning means in the longitudinal direction of the leaf springs, while permitting the necessary vertical movement needed to produce the objects of the invention. The roller permits relative lateral movement between the spring set and the air cushion devices, without transmitting this movement to the air cushion, yet the vertical forces imposed upon the spring set are transmitted to the air cushion devices that it may properly support the vehicle weight.

The air cushion system of the invention may be used with leaf spring sets that are shackled at one end, or are unshackled at both ends, and use a radius rod for maintaining the proper relationship of the spring sets and axle to the spring anchors.

BRIEF DESCRIPTION OF THE DRAWINGS

The aforementioned objects and advantages of the invention arising from the details and relationship of components of embodiments thereof will become apparent from the following description and accompanying drawings:

FIG. 1 is an elevational, sectional view of an air cushion system in accord with the invention as taken along section I—I of FIG. 3, FIG. 2 is an elevational, sectional view of the apparatus of the invention as taken through an air cushion bag along section II—II of FIG. 1, FIG. 3 is a side, elevational, sectional view of a vehicle suspension associated with the air cushion apparatus of the invention, wherein the vehicle leaf spring is shackled at one end, FIG. 4 is an elevational, sectional, side view of a typical installation of the air cushion system in accord with the invention as utilized with a "floating" suspension system using an axle radius rod, and FIG. 5 is a detailed view of an embodiment of the invention wherein the air cushion spring mounted bar is firmly connected to the leaf spring set.

DESCRIPTION OF THE PREFERRED EMBODIMENTS

The preferred embodiment is that illustrated in FIGS. 1 through 4, wherein a lost motion or relative movement may exist between the air cushion lower bar and the leaf spring set in the longitudinal direction of the leaf spring sets.

With reference to FIGS. 1 through 3, the invention will be described as used in conjunction with a conventional vehicle leaf spring suspension wherein one end of the leaf spring set, such as the front end, is shackled to the vehicle frame, and the other end of the spring set is unshackled. With particular reference to FIG. 1, the springs of conventional vehicle leaf spring sets are represented at 10, and these spring sets would normally be disposed longitudinally with respect to the vehicle, and are mounted below the frame thereof. The frame of the illustrated vehicle includes a pair of parallel channel members generally indicated at 12, which includes a vertically disposed base portion 14, and a horizontally disposed lower leg portion 16.

The air cushion devices are interposed between a pair of support bars. The upper support bar 18 for the air cushion devices is of a generally U-shaped configuration cross section including a central base portion and flanged leg portions extending therefrom. Bolts 20 extend through holes defined in the flanges of the bar leg portions, and in the frame leg portion 16 to affix the support bar 18 to the underside of the channel members 12 in a manner wherein the bar 18 will be transversely related to the length of the vehicle, and will be disposed above the leaf spring sets 10 adjacent the unshackled end thereof. As will be noted in FIG. 3, the support bar 18 is located between the axle 52 and the unshackled spring anchor bearing bracket 11, and is located adjacent the bracket 11.

A spring mounted bar 22 supports the lower end of the air cushion devices, and is formed of a U-shaped member similar to bar 18 but is inverted with respect to the bar 18. The bar 22 is of a length slightly less than the distance separating the spring sets 10 and a plate 24 is welded to each end of the bar 22 at 26. The plate 24 is perpendicularly disposed to the length of the bar 22 and extends above and below the bar as will be apparent from FIG. 1.

The air cushion devices illustrated consist of a pair of resilient bags or envelopes formed of rubber or similar flexible material. The air cushions include an air valve 29 which permits the air pressure within the cushions to be regulated. The cushions 28 may consist of "Airide" air cushion units of the two-convolution type, as manufactured by the Firestone Tire & Rubber Company. This type of air cushion includes upper and lower plates 30 which seal the ends of the air cushion, and bolts extending through the plates affix the upper and lower plates 30 to the bars 18 and 22, respectively. A central annular steel ring 32 encompasses the bag for reinforcement purposes.

The plates 24 are provided with a lower hole 34, and a pivot pin 36 is mounted in the plates at the upper region thereof, and extends outwardly with respect to the air cushions 28. A roller 38 is rotatably mounted on each of the pins 36, and the rollers 38 engage the upper side of the adjacent spring set 10 as will be apparent in FIGS. 1 and 3.

A retainer lever arm 46 is connected to each of the plates 24 by bolts 42 extending through holes 34. The other end of the retainer levers 46 are pivotly connected to a frame mounted bracket 48, which is mounted to and extends below the frame channels 12. The retainers 46 are pivotly connected to the brackets 48 by a pivot 50, FIG. 3. In this manner the retainers 46 prevent the spring supported bar 22 from moving in the longitudinal direction of the spring sets 10, yet permit the bar 22 to move toward and away from the upper support bar 18.

In FIG. 3 the axle of the vehicle ground wheel is represented at 52, and the axle is connected to the illustrated spring set 10 with a conventional U-bolt 54. The shackled end of the spring set is connected to the spring anchor bracket 56 by a pin 58 in a conventional manner.

In operation, the air cushions 28 are filled with sufficient air pressure wherein the normal unloaded weight of the truck vehicle with which the invention is employed will be such that the right end of the spring sets 10, FIG. 3, will be disengaged from the spring set engaging anchor surface 53 of the bracket 11. Thus, when the vehicle is unloaded it will be at least partially supported upon the compressed air within the cushion 28. By cushioning and suspending the vehicle upon air when in the unloaded condition the relatively stiff spring sets 10 will not transmit the shock and vibrations to the vehicle frame that usually occur when a vehicle is unloaded, or under light load conditions.

When the vehicle is loaded, the vehicle weight will be such as to compress the air cushion devices 28 sufficiently to permit the right end of spring sets, FIG. 3, to engage the usual anchor surface 53 of the bracket 11, and produce the conventional direct engagement of the spring sets with the bracket 11. Thus, the air cushion devices are not overloaded, and the vehicle is capable of transporting its rated load.

As the support bars 22 are connected to the spring sets only by the fact that the rollers 38 engage the upper side of the spring leafs, the flexing of the spring sets 10 in their longitudinal direction will not cause a movement of the bar 22 in this direction. Movement of the bar 22 in the longitudinal direction of the spring sets 10 is prevented by the retainers 46, and the antifriction rolling interconnection between the plates 24 and the spring sets 10, prevents the spring sets from directly causing lateral movement of the bar 22. Yet, vertical movement of the bar 22 is unimpeded due to the pivot connection 50.

A variation of the use of the components of the invention is illustrated in FIG. 4 wherein a conventional "floating" vehicle truck suspension is illustrated. In this figure components identical to those previously described are indicated by identical reference numerals for the apparatus located to the right of the axle 52', and primed reference numerals are used to denote the air cushioning device positioned to the left of the vehicle axle 52'. In FIG. 4, the leaf spring 10' is not shackled at either end. The left end of the spring set 10' is adapted to normally engage an anchor bearing surface 55, and the right end of the spring normally engages an anchor bearing surface 57 formed on the compensating bracket 59. The axle 52' is maintained in the desired position by a radius bar 60 pivotly connected at 62 to the lower end of the spring hanger bracket 64.

The air cushion apparatus to the right of the axle 52' is identical to that described with respect to FIGS. 1 and 3, and the air cushion apparatus mounted upon the spring set at the left of the axle 52' is also identical to the previously described apparatus except that the retainer 46' extends toward the left, for pivotal connection to a frame attached bracket. With this type of "floating" suspension the air pressure within the air cushions 28 and 28' is sufficient to remove both ends of the spring set 10 from its bearing surfaces 55 and 57, wherein the spring set and frame is solely interconnected by the air cushion means, when the vehicle is unloaded, or under light load conditions. When the vehicle is loaded the air pressure with the air cushions will be overcome and the spring set ends will engage the spring anchor surfaces in the conventional manner. Of course, the rollers 38 and 38' will function in the same manner as previously described and any movement of the spring sets 10' in the longitudinal direction will not be transmitted to the cushioning apparatus.

FIG. 5 illustrates an arrangement similar to that previously described, except that the spring mounted bar 22" is firmly connected to the spring sets, and no lost motion or antifriction connection exists between the spring sets and the end of the lower bar 22". In FIG. 5 the upper bar 18" may be identical to that previously described. The lower bar 22" includes an adapter 66 adapted to extend over the associated spring set 10", and a U-bolt 68 firmly connects the adapter to the spring set. Of course, in this construction, if the U-bolt 68 is tightly connected to the spring set, it causes the support bar 22" to move in a lateral direction with flexing of the associated spring set 10". While this type of apparatus will provide a functional air cushioning support for the vehicle within the concept of the invention, this embodiment is not preferred as the lateral movement of the lower support bar will cause the air cushions to wear more rapidly than the arrangement described in the previously mentioned embodiment.

It will be appreciated that the components used in the practice of the invention are of economical manufacture, and the apparatus may be installed on original equipment, or installed upon existing equipment. By placing the air cushions "inside" of the vehicle spring sets clearance problems are obviated, and by using the roller 38 and retainers 46 a long effective life of the air cushions is assured.

While the emphasis has been placed on the air cushions disengaging the leaf spring ends from the hanger bearing surfaces under unloaded conditions, this relationship can also be accomplished by the use of the invention with loaded vehicles to provide improved suspension characteristics by increasing the pressure within the air cushions.

I claim:

1. Vehicle air cushion apparatus adapted to be used with vehicles having a frame supported upon sets of elongated leaf springs affixed to a common axle upon which ground wheels are mounted, the leaf spring sets having ends adapted to engage leaf spring bearing means mounted upon the vehicle frame, comprising, in combination, a transversely disposed support bar affixed to the vehicle frame above the leaf spring sets, a spring-mounted bar having ends and interposed between sets of leaf springs and transversely related to the vehicle frame below said support bar, spring set engaging means defined on said spring-mounted bar ends engaging the upper side of said spring sets, said spring set engaging means being located intermediate a bearing means and the axle of the associated leaf spring set, and air cushion means interposed between said support and spring-mounted bars located between said spring-mounted bar's ends and adapted to support the vehicle frame, said air cushion means being inwardly disposed of said springs and capable of preventing operative engagement of the adjacent bearing means and spring set end.

2. Vehicle air cushion apparatus as in claim 1 wherein said spring set engaging means includes relatively movable means permitting relative movement between said spring set engaging means and the associated spring set in a direction substantially parallel to the length of the associated spring set.

3. Vehicle air cushion apparatus as in claim 2 wherein said relatively movable means comprises antifriction means engaging the upper side of the associated spring set.

4. Vehicle air cushion apparatus as in claim 2 wherein said relatively movable means comprises a roller rotatably mounted on each of said spring-mounted bar ends engaging the upper side of the associated spring set.

5. In a vehicle air cushion apparatus as in claim 2, a retainer affixed to said spring-mounted bar, and means affixing said retainer to the vehicle frame permitting said spring-mounted bar to move toward and away from the frame in a vertical direction and restraining said spring mounted bar from moving in the longitudinal direction of the spring sets.

6. Vehicle air cushion apparatus as in claim 5 wherein said retainer comprises a rigid lever arm and said means affixing said retainer to the frame includes a bracket affixed to the frame, said lever arm being pivotably connected to said bracket.

7. Vehicle air cushion apparatus as in claim 2 wherein said relatively movable means comprises a roller mounted upon each end of said spring-mounted bar engaging the upper side of the associated spring set, said rollers having an axis of rotation transversely disposed to the length of the associated spring set, a rigid lever connected to each of the ends of said spring-mounted bar and pivot means pivotally connecting said lever arms to said frame at a location spaced from said bar ends for pivotal movement about an axis substantially parallel to the axis of rotation of the associated roller.

8. In a vehicle air cushion apparatus as in claim 7 brackets affixed to the vehicle frame spaced from said spring-mounted bar, said pivot means being mounted in said brackets.

References Cited

UNITED STATES PATENTS

| 3,309,107 | 3/1967 | Chieger | 280—124 |
| 3,201,141 | 8/1965 | Bernstein. | |
| 2,407,345 | 9/1946 | Reid | 267—56 X |

PHILIP GOODMAN, Primary Examiner

U.S. Cl. X.R.

180—22; 267—31